March 8, 1955 F. L. GERIN 2,703,489
VISCOSITY COMPARATOR
Filed Oct. 19, 1949 3 Sheets-Sheet 3
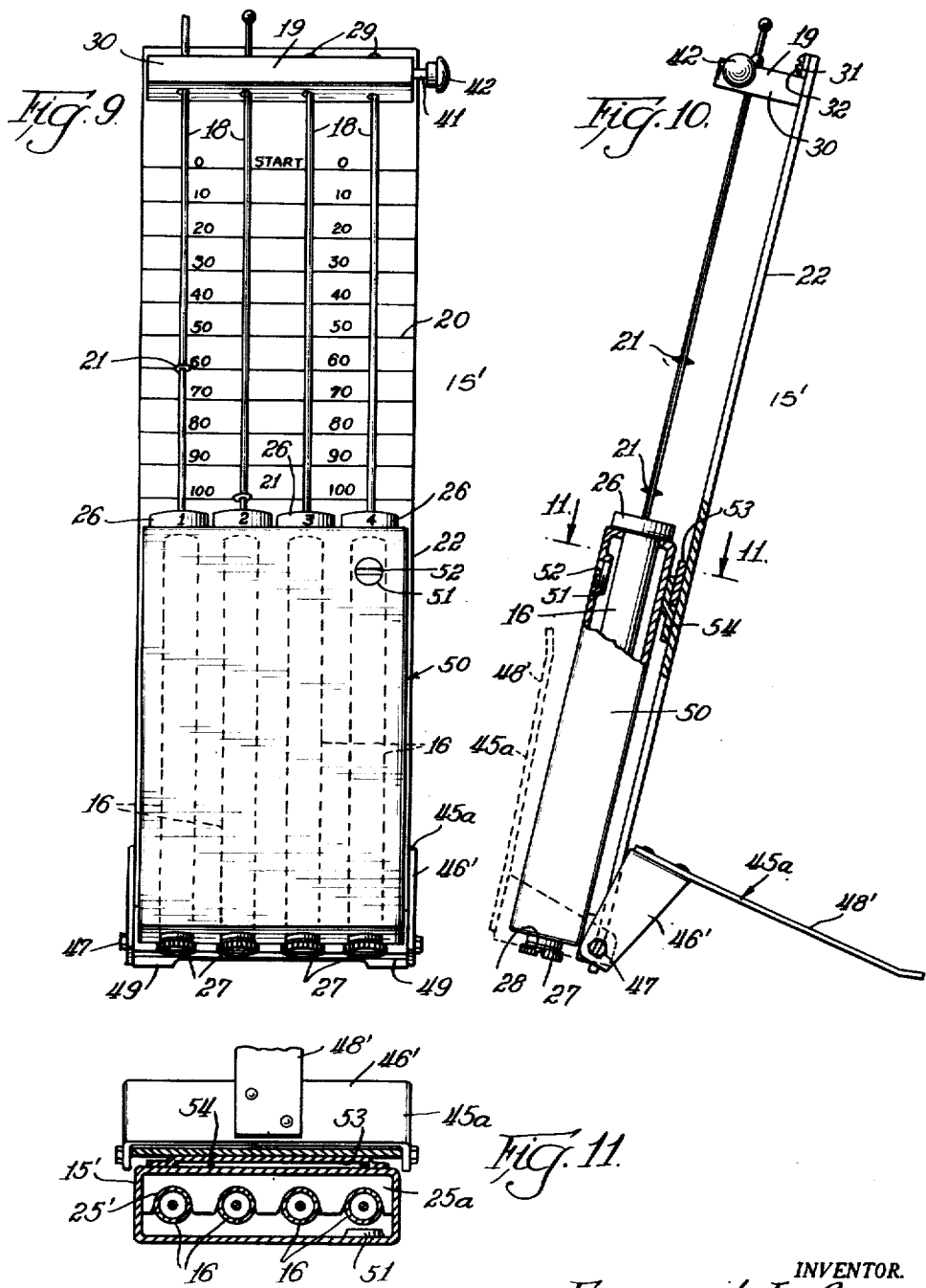
INVENTOR.
Fernand L. Gerin

United States Patent Office 2,703,489
Patented Mar. 8, 1955

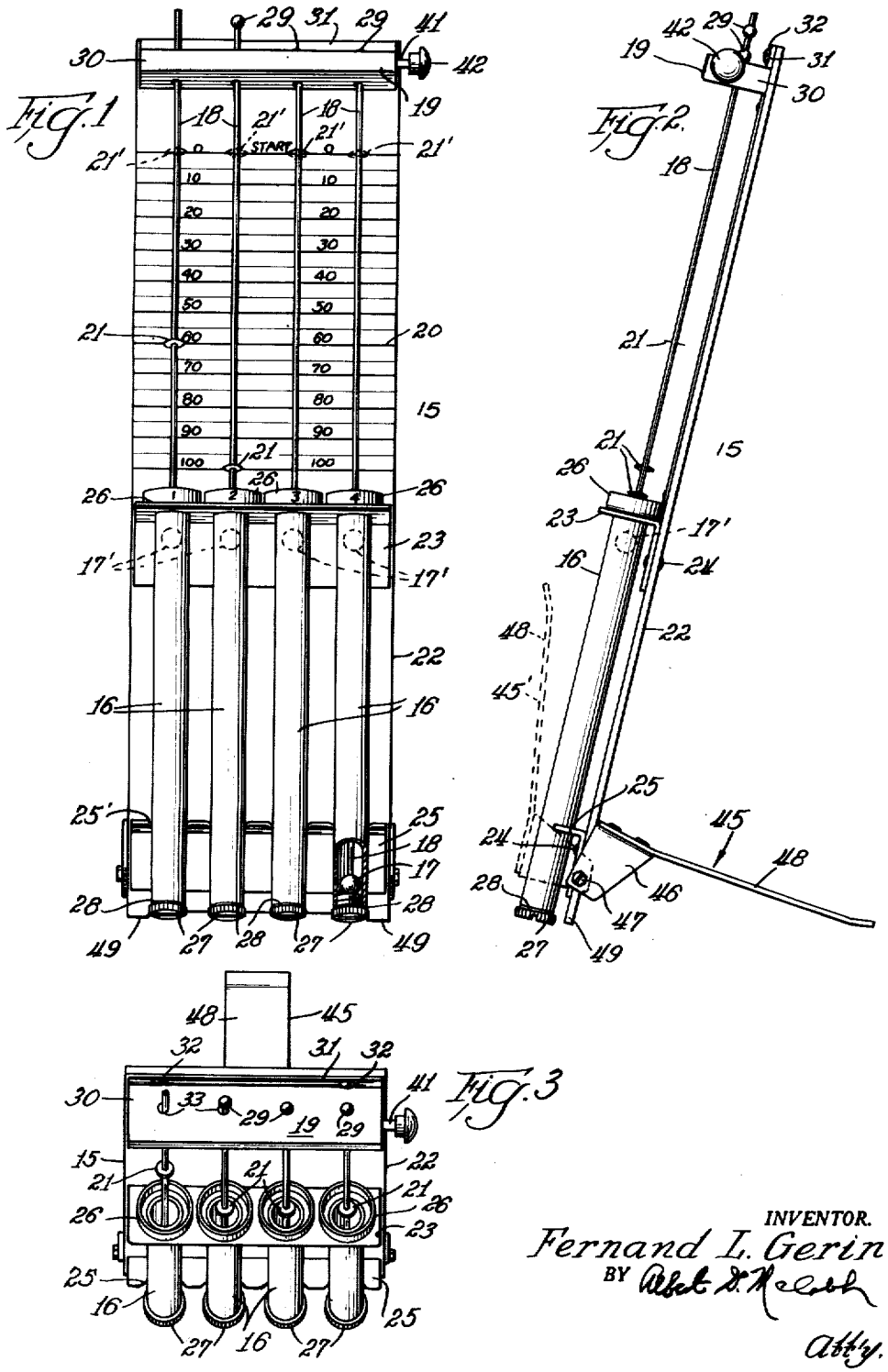

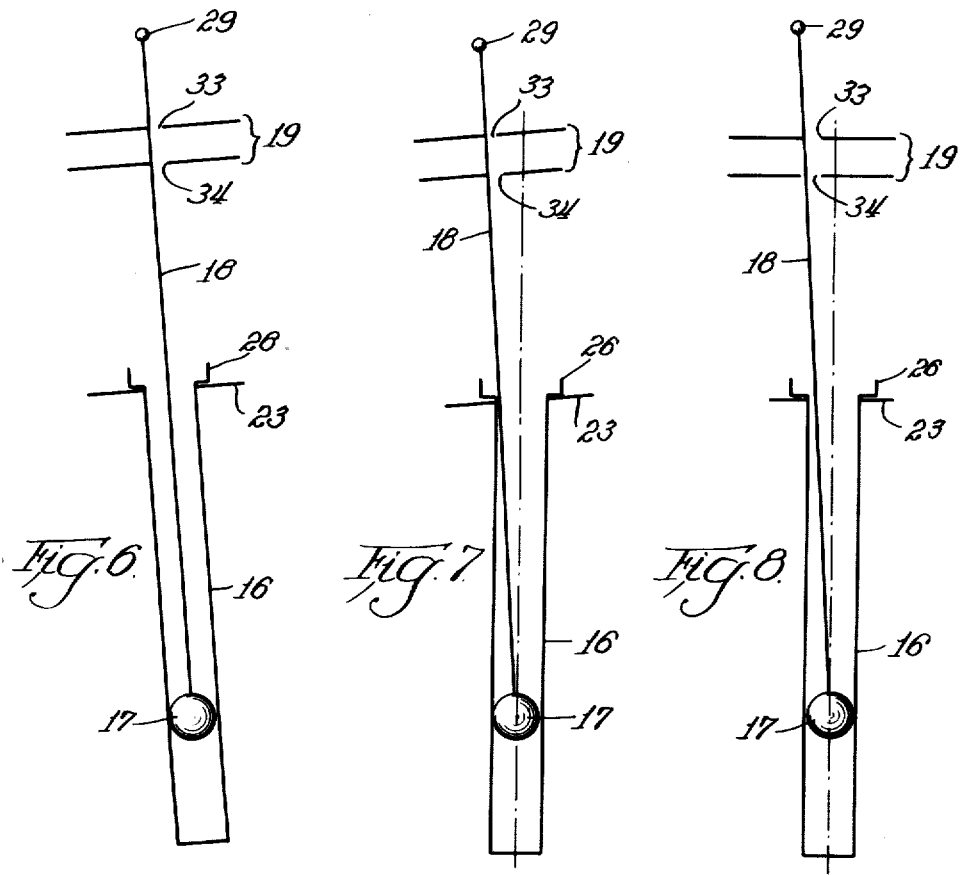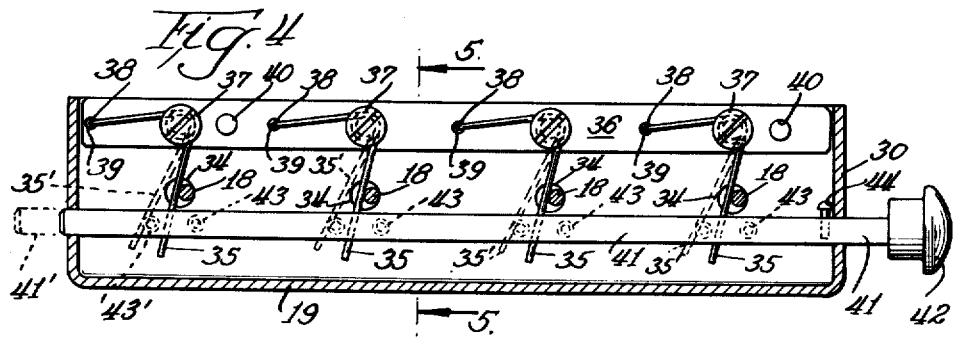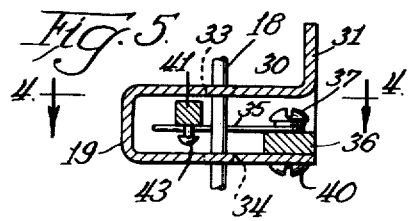

2,703,489

VISCOSITY COMPARATOR

Fernand L. Gerin, Locust, N. J.

Application October 19, 1949, Serial No. 122,293

10 Claims. (Cl. 73—57)

This invention relates to viscosity comparators and dilution indicators, and more particularly to viscosity comparators and dilution indicators of the falling ball type.

Many tests have been proposed to measure critical contaminants in lubricating oils. Of these, for example, there have been tests to measure deposit forming substances, tests for sediment in water and scuff metal, tests to determine acidity and tests to determine viscosity. The test to determine viscosity is one of the most important. None of these tests are difficult and several benefits occur when they are made in an engine room by the operator of an engine. When these tests are performed by the engine operators, they tend to put lubrication on a level with other vital operating conditions regularly observed and recorded in a log. The importance of knowing that lubricating oil is in proper condition is well understood and reason enough for oil inspections.

There is another reason equally valuable, although not so well known, for making tests of engine lubricant each week. Changes in contaminants and in the rate of contamination are a sensitive indicator of altering conditions inside an engine. Regular oil inspections can show up many derangements early enough to prevent more serious symptoms. Stuck rings and plugged oil rings, for instance, reflect in an increased rate of gummy contamination; partly clogged spray nozzles cause fuel dilution, as do leaky fuel lines. Failure of water jacket seals can be predicted by the first discovery of water in lubricating oil. Every so often, scrapping the entire charge of lubricating oil in an engine is avoided by the discovery of the leakage of water or fuel before it has gone too far.

Viscosity tests are the best way to measure diesel engine fuel dilution. Viscosity shows whether an oil has proper body to serve as a lubricant. It is quite generally accepted as being the first essential for satisfactory results, therefore, the most important single property of a lubricating oil. It determines the bearing friction, cushioning effect, heat generation and the rate of flow under given conditions of load, speed and bearing design.

Fuel dilution reduces viscosity and asphalt increases it, but the effect of a little fuel is greater than that of much asphalt. As it is known, fuel dilution in diesel engine oil indicates either raw fuel leaks or faulty combustion due usually to fouled injection nozzles. Fuel itself is practically non-lubricating and it interferes with normal oil film. Not being a refined petroleum product, it is also an abundant source of deposit forming material and of acid. When dilution is due to incomplete combustion, the diluting fuel is partially cracked in the combustion chamber. The products of such cracking are extremely unstable.

In the past, the Saybolt viscosimeter has been the most widely used instrument for measuring viscosity. When an oil is said to have viscosity of "95 seconds Saybolt at 100° F.," it means that the oil filled a receiving flask in 95 seconds of time when tested at a temperature of 100° F.

There are also many other known methods of measuring viscosity, the apparatus for which purpose is known as a viscosimeter. Viscosimeters may be divided into two general classes—absolute viscosimeters in which the constant for converting the reading to absolute units can be calculated from the dimensions of the apparatus and practical viscosimeters in which the constant must be determined experimentally from measurements on liquids of known viscosity. The viscosimeter of this invention is preferably of the practical type in which the viscosity of a lubricant being tested is compared against an oil of standard viscosity and is particularly adapted for determining the change in viscosity of the unknown lubricant due to fuel dilution and other causes when compared with the original lubricant or a standard lubricant.

The manipulation of the usual form of Saybolt viscosimeter usually requires considerable skill and takes from one to three hours of time to bring the heating bath and the sample to exactly the correct temperatures. One of the difficulties is that the sample cools off in pouring it from the dish or pan in which it is heated into the tube surrounded by the bath. If there is any variation from the standard test temperature in either or both the bath or the sample, the viscosity test will result in inaccurate values. Should this occur, the entire procedure must be started all over again. It is, therefore, apparent that this type of apparatus can only be trusted in the hands of a skilled and exacting laboratory technician. An untrained person or careless technician is very likely to compromise the temperature adjustments. This results in the collection of virtually useless or misleading data.

In the operation of a diesel power plant, for example, in which large quantities of lubricating oil are utilized, it is very desirable to know at frequent intervals the extent to which the oil is being contaminated by fuel. The conventional practice of diesel power plant operators has been to run the engines without testing the lubricating oil except once or twice a year. Such tests usually are made by sending oil samples to a testing laboratory because the operator lacks sufficiently trained personnel to make accurate viscosity determinations. The results of such tests usually are received after a delay of several weeks, when they are of little if any significance because the condition of the oil in use has changed in the meantime.

Although the instant invention is particularly useful in power plant operation, it is also well adapted for other uses, e. g. in filling stations to determine the need of an oil change in the crank case of an automobile engine.

The present invention aims to provide an improved apparatus for testing the viscosity of liquids, such as lubricating oil, which will enable viscosity determinations to be made accurately at frequent intervals at a power plant or service station without the employment of skilled technicians.

Accordingly, an object of the present invention is to provide an improved apparatus for making viscosity determinations.

Another object of the invention is to provide an improved form of viscosity comparator or dilution indicator of the falling ball type which stops the balls in their respective positions where the reading may be taken so that the observer is not hurried.

Another object of the invention is to provide an improved form of viscosimeter of this type which is practical for engine room use in that it eliminates the need for skillful (laboratory level) handling.

Another object of the invention is to provide an improved viscosimeter wherein one or several samples may be compared with one or more standard samples.

Still another object of the invention is to provide a viscosimeter in which the time of making any test is reduced to a minimum.

Another object of the invention is to eliminate the difficulty in independently heating two bodies of liquid to exactly the same standard temperature.

Another object of the invention is to provide an improved falling ball viscosity comparator in which used oil may be compared with new oil having measured amounts of fuel added.

Still another object of the invention is to provide an improved viscosimeter in which an unknown oil sample may be compared with oils of known viscosity heated to standard temperatures.

Another object of the invention is to provide an improved viscosimeter of the falling ball type in which the errors attributable to retarding effect of unpredictable contact of a falling ball with a tube for the liquid under test are substantially eliminated.

Another object of the invention is to provide an improved starting and stopping mechanism for controlling movements of falling balls within the respective oil tubes.

Another object of the invention is to provide an improved falling ball type viscosimeter which may be used to afford readings in Saybolt seconds or serve merely as a dilution indicator.

Another object of the invention is to provide an improved folding support for a portable viscosimeter of the falling ball type which is adapted to support the viscosimeter at an optimum angle to the vertical in its operating position and to be positioned in juxta-position to the viscosimeter tubes in the transport or collapsed condition of the viscosimeter.

Other objects and advantages of the invention will be apparent from the following description and the accompanying drawings in which similar characters of reference indicate similar parts throughout the several views.

In the three sheets of drawings:

Figs. 1, 2 and 3 are respectively front, side and top views of a preferred form of my new viscosity comparator of the falling ball type;

Fig. 4 is a plan view partly in section taken along line 4—4 of Fig. 5 illustrating the trigger mechanism for releasing and reengaging the rods which support the balls;

Fig. 5 is a vertical view partly in section, taken along line 5—5 of Fig. 4, of the trigger mechanism;

Fig. 6 is a schematic view illustrating one form of the trigger mechanism which insures continuous contact between a ball rod and its guide, with the entire instrument tilted, to avoid error attributable to the retarding effect of unpredictable contact;

Fig. 7 is a schematic view of another embodiment of the invention wherein, when the instrument is tilted, the oil tubes hang free and vertical to assure continuous contact of the ball rods with their guides afforded by the trigger mechanism to avoid error attributable to the retarding effect of unpredictable contact;

Fig. 8 is a schematic view showing another form of the invention in which the guide holes of the trigger mechanism are positioned to one side of the center line of an oil tube to assure continuous contact of the ball rods with the guides afforded by the trigger mechanism;

Fig. 9 is a view in elevation of another embodiment of my invention in which a container is provided for a plurality of tubes for oil specimens involved in a test to cause the respective specimens quickly to assume the same temperature;

Fig. 10 is a side view partly in elevation and partly in section of the embodiment of Fig. 9, illustrating the collapsible support for the device; and Fig. 11 is a sectional view taken along line 11—11 of Fig. 10 illustrating the detachable mounting of the container for the tubes of the viscosimeter of the embodiment of Fig. 9.

In its general aspects, my new device comprises a plurality of matched tubes for receiving oil specimens or other liquid specimens to be compared as to viscosity. In each of the tubes there is mounted a ball having greater density than the liquids of which specimens are to be compared, each of the balls being suspended by a rod-like member which is adapted to be released by the operation of a trigger mechanism and reengaged by that mechanism at the will of the user. Graduated scales enable the user to compare viscosities in terms of relative dilution or otherwise. The trigger mechanism and the rod-like members cooperate in a novel manner to minimize error. A collapsible support is provided for holding the viscosimeter appropriately inclined to the vertical in the operating position of the viscosimeter, and in the collapsed position of the support the viscosimeter is adapted for compact storage.

Referring to Figs. 1 to 5 inclusive, a preferred form of viscosimeter 15 will now be described, the viscosimeter preferably comprising a plurality of matched tubes 16 in each of which is slidably mounted a ball or equivalent movable means 17. Each of the balls is affixed to the lower end of a rod-like member 18. The rod-like members are slidably mounted in a trigger mechanism 19. The trigger mechanism will be particularly described later with reference to Figs. 4 and 5.

Contiguous to the rod-like members and positioned above the ends of the matched tubes 16 is a graduated scale 20, Fig. 1. Indicia or annular markers 21, Figs. 1 and 3, affixed to each of the rod-like member 18 may have their relative positions indicated by the graduated scale 20.

The mechanism of the viscosimeter, comprising the matched tubes, the falling balls 17, the trigger mechanism 19, the rod-like members 18 attached to the balls 17 and the graduated scale 20, is suitably affixed to a support member 22. Each of the tubes is supported at its upper end by a secondary supporting member in the form of an angular bracket member 23 provided with a plurality of holes complementally formed with respect to the tubes. The member 23 is affixed to the support member 22 by riveting or other securing means 24. The bottom ends of the tubes 16 are supported by an angular bracket 25 provided with U-shaped openings 25'. The bracket 25 is similarly affixed as the bracket 23 by rivets 24, Fig. 2.

Each of the matched tubes 16 is provided at its upper end with an annular enlarged flanged construction 26 to form an overflow chamber as the level of the oil rises when the ball is placed in the tube and to provide support for the tubes 16 in their respective opening in the bracket 23, Figs. 1 to 3. The flanged construction 26 also provides a means for supporting the tube when positioning the tube in a suitable stand (not shown) whereat the tubes are filled with liquid preparatory to mounting the tubes in the viscosimeter as shown in Fig. 1. The flanged construction 26 also constitutes means whereby a tube may be placed on the support member 22 without the operator's hands necessarily engaging the elongated wall of the tube, tending to heat the tube and the liquid therein which would possibly cause error in the use of the viscosimeter. A plug 27 is threadably secured in the open lower end of each tube 16, Fig. 1, for sealing the end of the tube, any leakage of oil being prevented by a gasket 28. It is thus possible to remove the tubes from the viscosimeter after each use thereof and by pushing a cleaning cloth through each tube clean the interior of the tube. However, normally each tube may be sufficiently cleaned by up-ending it on its flange 26 to drain.

The rod-like members 18 for supporting the balls 17 within the tubes are so constructed that when each of the rods 18 is released its ball 17 is permitted to strike a plug 27 as shown in Fig. 1. In this situation, the markers 21 are in horizontal alignment and each indicates 110 on the graduated scale 20. In the raised positions of the rod-like members 18, each of the markers 21 may be positioned on the zero line of the graduated scale 20 as shown in the dotted position 21' with each of the balls 17 positioned as shown at 17', Fig. 2. A spherical knob 29 is provided for each of the rod-like members 18 for individually resetting that rod-like member to the zero position as shown at 21', Fig. 1. These knobs 29 also may be simultaneously engaged and raised by a thin strip of metal provided for that purpose.

Referring particularly to Figs. 1, 4 and 5, I have provided a novel trigger mechanism 19 adapted for simultaneously releasing or reengaging the rod-like members 18. The trigger mechanism 19 comprises a U-shaped housing 30 having a flange 31 affixed to the support member 22 by suitable securing means 32, Fig. 2. Each of the rod-like members 18 is adapted to be releasably positioned in upper and lower holes 33 and 34 of the U-shaped housing, Figs. 1 and 4. Each of the rod-like members 18 is releasably latched in position within the holes 33 and 34 by a V-shaped spring 35 constructed as shown in Figs. 4 and 5. The coils of each spring 35, Fig. 5, are secured to a transverse support member 36 by a screw 37 and one leg 38 of the spring is latched in a complementally formed hole 39 of the transverse support. The transverse support is detachably mounted within the U-shaped housing as shown in Figs. 4 and 5 and affixed thereto by screws 40.

In order to simultaneously release or reengage the rod-like members 18, I provide a trigger Figs. 1, 4 and 5, comprising a transversely extending rod 41 slidably journalled in holes in the opposite ends of the U-shaped housing 30. A button 42 for moving the trigger rod 41 is provided and inward movement of the rod 41 is limited by the button 42. The extent of the possible motion of the rod 41 is shown by its dotted position 41', Fig. 4. A pin 43 depending from the rod 41 for each of the rod-like members 18 provides a lost-motion connection between rod 41 and the contiguous end of one of the springs 35. In the latched positions of the rod-like members 18, the pins 43 are positioned as shown in Fig. 4. In the movement of the trigger rod 41, pursuant to the operator pushing the button 42, all of the springs 35 assume the dotted position 35' and the pins 43 the dotted position 43', Fig. 4, permitting release of the rod-like members 18. Upon release of the button 42, the springs 35 move the rod 41 to its position shown in solid lines, the stop pin 44 preventing further movement of the rod 41. The strength of each of the springs 35 is such that the rod-like members 18 are stopped and held in their reengaged positions as the balls 17 travel through the tubes 16. The springs 35, however, permit individual resetting of the rod-like members 18 to their initial starting positions 21', as shown in Fig. 1.

I have found that there have been serious inaccuracies in results when the tubes 16 are mounted vertically and with the rods 18 also vertical and in line with the axes of the tubes. Therefore, I have provided a bracket 45 adapted, as shown in Fig. 2, to position the support member 22 at an inclination to the vertical so that the tubes 16 are supported at an inclination to the vertical as are the rods 18 for supporting the balls 17 in the tubes 16. This arrangement is shown schematically in Fig. 6, illustrating the position of a ball in its tube 16 and the disposition of a rod 18 in holes 33 and 34 of the trigger mechanism following release of the trigger mechanism.

The bracket 45 comprises a U-shaped member 46 pivoted on stud screws 47. The U-shaped member 46, in the position shown in Fig. 2, holds the support member 22 in its inclined position. A rearwardly extending leg 48, formed as in Fig. 2 and affixed to the member 46, cooperates with feet 49 formed on the lower end of the member 22 to afford three-point support for member 22. Bracket 45 takes the dotted position 45' of Fig. 2 when it is desired to fold up the viscosimeter and place it in a suitable container for storage or shipment.

In collapsing the bracket to the position of 45', the support 22 may be held in one hand and the bracket 45 swung by the leg 48 toward the front of the device. The U-shaped member 46 thereupon engages the lower ends of the tubes 16 and moves the tubes upwardly until the bracket is completely collapsed, whereupon the tubes return to their original positions. In order to return the bracket 45 to the position shown in Fig. 2, it is necessary to move the tubes upwardly until the bracket may be swung to the rear after which, when the viscosimeter is set upon a suitable support, the tubes return to their original positions as shown in Figs. 1 and 2 with the viscosimeter properly supported for use.

As previously pointed out, if the tubes were mounted vertically there would be certain inaccuracies in results. The rods 18 would float willy-nilly down through the guide holes 33 and 34 of the trigger mechanism, sometimes contacting and sometimes not contacting the edges of each hole. The retarding effect of the unpredictable contacts between the rods and the hole edges would cause up to at least 10% variance in making successive tests of the same oils. However, with the viscosimeter constructed as shown in Figs. 2 and 6, this variance has been rendered negligible.

I have illustrated in Fig. 7 another arrangement whereby this variance in test results is overcome. In the arrangements of Figs. 6 and 7, the trigger mechanism 19 is so positioned that the rod guide holes 33 and 34 are in line with the axes of the tubes 16. In the arrangements of Figs. 6 and 7 in which the guide holes 33 and 34 are in line with the axes of the tubes 16, the entire instrument is tilted to make the rods 18 lie against their respective guide holes. If the tubes 16 are rigidly held in the instrument they tilt with it as illustrated in Fig. 6, but if the tubes hang from their flared ends 26 only, as shown in Fig. 7, the tubes remain vertical. In each case, continuous contact of the rods 18 in the holes 33 and 34 is assured, thus avoiding the unpredictable contacts which would cause variance in successive tests on the same oils.

I have illustrated in Fig. 8 another arrangement for overcoming the retarding effect of unpredictable contact. In the arrangement of Fig. 8, the trigger mechanism 19 is so mounted that the rod guide holes 33 and 34 are slightly off the center lines of the tubes. In this arrangement, the instrument may be positioned vertically. The balls 17 find their natural centers in the tubes 16 but the rods 18 now do not stand in vertical lines. The rods now contact the edges of the hole 33 during the entire travel of the rods and the retarding effect of such contact is substantially constant.

The operation of the viscosimeter will now be described. The operation thereof is essentially the same whether the tubes 16 and the trigger mechanism 19 are positioned as illustrated schematically in Fig. 6 or Fig. 7 or Fig. 8.

In utilizing the viscosimeter of Figs. 1 and 2, either one sample or two or three unknown samples may be compared with a standard sample. However, I prefer to provide five additional tubes in addition to the four mounted on the apparatus so that if necessary as many as eight samples may be compared with the known sample. All that is necessary to facilitate substitution of a tube for one mounted on support 22 is to position above the latter tube the ball with which it is associated. This is done by drawing such ball upwardly by the knob 29 of its rod 18. The tubes are conveniently numbered 1, 2, 3, etc. as shown for identifying the standard and unknown samples.

In effecting tests with my equipment, temperatures are a critical factor. Oil that has reached room temperature before filling the metal tubes usually requires fifteen minutes to equalize. Samples just brought in need about thirty minutes.

The tube holder support 22 may be held in any position except exactly vertical while the balls are falling. The preferred position is automatically maintained by the support stand 45 as shown in Fig. 2. Any angle of more than five degrees from the vertical is satisfactory.

With a used oil sample placed in one of the tubes for a comparison with a standard sample of undiluted new oil in another tube, the operator pulls up the rods 18 associated with those tubes so that markers 21 are at zero on the scale as indicated at 21. The operator presses the release button 42 until one or both markers reach, for example, the 100 mark as shown in Fig. 1. Assume that when the used oil marker reaches 100 on the scale the new oil marker reaches 60 as illustrated in Fig. 1. This means that the viscosity of the used oil is only 60% of the viscosity of the standard undiluted new oil. Oil which has had its viscosity reduced by as much as 40% is usually considered unsatisfactory. If the new oil marker had reached 100 ahead of the used oil marker, it would have indicated an increase in the viscosity of the used oil in service.

It is obvious that tubes 3 and 4 could have been filled with other samples of used oil so that they in turn could be checked against the new oil in the #1 tube, time having been saved through allowing all three used oil samples to reach the temperature of the new oil in the same initial waiting period.

The four balls 17 can be dropped in pairs, threes or fours. The balls 17 are started from zero positions indicated by the markers 21' by pressing the manual release button 42 and stopped in flight by releasing that button when one ball reaches 100. The functioning of the trigger mechanism is such that the markers are held where they are stopped in flight and there maintained as long as desired.

In the operation of the trigger mechanism, it is preferred to press the push button 42 with a quick motion so that the functioning balls 17 start down together which, of course, is essential. When putting back a rod that has slipped out of the trigger mechanism, it it necessary to hold the push button all the way in. The holes 33 and 34 of the trigger mechanism are large enough to permit passage of the knobs 29 for detaching and attaching the balls 17 and their rod-like members 18.

In order to compare used oil with new oil having measured amounts of fuel added, the operator may mix new oil with some fuel so as to have, for example, the #1 tube filled with new oil, the #2 tube with oil containing 5% of diluent and the #3 tube with oil containing 10% of diluent, and with the used oil sample in the #4 tube. The operator can then determine the per cent drop in viscosity of the used sample compared with its original condition and later estimate the approximate per cent of its fuel dilution.

The operator may make up other samples of known dilution as is necessary. By comparing these mixtures with undiluted new oil, each operator may establish what viscosity changes mean in terms of per cent dilution by his particular fuel. This is of paramount interest when a condemning limit for fuel dilution has been specified by an engine builder.

In utilizing the apparatus as a viscosity comparator and fuel dilution indicator, change in viscosity is shown by the fall of a ball in used oil compared with the fall of another ball in oil which has not seen service. The balls are released at zero by the manual button 42 and stopped in flight when one ball reaches 100. The reading reached by the slower ball applies to the oil with the fast ball.

This apparatus may also be used to compare an unknown oil with oils of known viscosity heated to standard temperature. However, with my device the difficulty of independently heating two bodies to exactly the same temperature is eliminated. It is not necessary, for example, to hold the temperature at exactly to one of the standard test temperatures 100° F., 130° F., or 210° F., since the effect of moderate departures will be substantially the same on the comparison standard and on the samples being tested, so long as the tubes are immersed long enough (about 10 minutes) so the oils in the tubes have equalized. The reason for heating the bath is that when two oils have different viscosities, the difference is greater at, say 70° F. than when they are at, for example, 200° F. Therefore, when it is desired to obtain laboratory levels of accuracy, the comparison standard and the sample are compared at reasonably close to the temperatures of the Saybolt reference. For instance, if the Saybolt viscosity is known at 100° F., one may compare the unknown oil and the known oil with the bath anywhere between 95° F. and 105° F. without significant error. By contrast, when you use a Saybolt or other instrument to measure viscosity in absolute terms at 100° F., an inaccuracy of ⅓ degree makes 1% inaccuracy in the result.

In order to use the apparatus as described above in this manner, the entire device may be set in a liquid bath for heating the tubes. The bath may have positioned therein a thermometer for determining the temperature of the bath and a suitable heating element for maintaining the bath at the correct temperature. When used in this manner the tubes are immersed in a bath with a heater so that the temperature may be adjusted to one of the standard test temperatures 100° F., 130° F. or 210° F. However, as discussed above, for the successful use of the device, it is not necessary to hold the temperatures exactly at 100° F., 130° F., or 210° F. as long as they are within the range chosen. If we put oil of 700 seconds at 100° F. in tube #1, 500 seconds in tube #2, and 300 seconds oil in tube #3, and if the marker 21 for the sample under test in tube #4 reaches 100 and the marker in tube #2 reads 90, we have an indication that the unknown sample has a Saybolt viscosity of 450 seconds (90 per cent of 500). A heavier sample oil would more nearly match the 700 seconds oil of tube #1 and a lighter sample would be compared with 300 seconds oil in tube #3.

My apparatus is also adapted to obtain equally as accurate results when no bath or heater is available, for example, when used in power plants. When used in this manner for lubrication control in power plants, all the measurements are made always at room temperature and the slight effects of day to day temperature ranges are not significant and fine accuracy is of no importance. The engine oils show changes up to 60% from the new. Changes of 10% or 20% are ignored.

Although the apparatus may be used as described by placing the entire device, or more particularly the tubes, within the bath of heating fluid, I have shown another form 15 of my viscosimeter in Figs. 9 to 11. With this modification, it is not desired to heat the tubes in a bath assembly. The purpose of this modification is to equalize temperatures of the different oils more rapidly through a liquid, the heat transfer being much better than air. For example, when one takes oil from an engine which is running, the oil is about 140° F. The liquid within the container for the tubes equalizes the temperature of the oil from an engine with the new oil taken from a drum on the floor at room temperature in 10 minutes, whereas if the device is hung in air, it takes 30 minutes to equalize.

The device is equally useful for testing multiple samples for dilution. Since the apparatus is largely identical with that of Figs. 1 to 3, only the differences will be described in detail. In this embodiment of my invention, the four tubes are positioned within a container 50 which provides a space about the tubes into which a suitable fluid for heating the tubes to a predetermined temperature may be poured through an opening 51 which is suitably closed by a threaded plug 52. Each of the tubes 16 is formed as previously described and is inserted through complementary holes in the bottom and top of container 50. A support 25a having U-shaped slots 25' may be used for centering the tubes. The tubes may be suitably affixed thereto to provide a leak-proof container for the heating fluid to be placed in the container to uniformly heat the tubes to an optimum temperature. Since the plugs 27 and gaskets 28 are externally positioned at the lower end of the container 50, the plugs may be removed when desired and a cloth run through the tubes to clean the tubes after each use although it is to be understood that the tubes normally may be drained by up-ending the container on the flanged ends 26 of the tube.

The container 50 is detachably mounted on the support member 22 by a bracket 53 spaced from the container and affixed thereto and complementally formed with respect to a bracket 54 suitably affixed to the support member 52. With this construction, the entire container including all four tubes may be detached by lifting the bracket 53 from the bracket 54. To do this, each of the rods 18 is withdrawn upwardly to its maximum position, for example, with its marker 21 abutting against the bottom of the trigger mechanism 19 and with its ball 17 entirely removed from its tube. The container is replaced by a reverse order of steps. When it is desired to run the viscosity or dilution test with this particular embodiment, the samples are brought to a predetermined temperature. A suitable fluid, for heating the tubes and the fluid samples within the tubes, is poured within the opening 51 of the container. The tests are then run as previously described.

The collapsible bracket 45a is generally similar, but not quite identical, to bracket 45 previously described.

It is to be understood that the tubes should be matched as nearly as possible with respect to their inside diameters and that the balls 17 should also be matched in order to obtain uniform results. It is understood that the balls are highly polished and the interior of the tubes free from all protuberances.

While I have illustrated preferred embodiments of my invention, modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent to the United States is:

1. A viscosimeter adapted for determining the fluidity of a plurality of liquids with respect to a standard liquid, comprising a substantially upright support member, a secondary support member carried at the vertical midportion of the upright support member, a plurality of tubes for containing the aforesaid liquids mounted on and extending downwardly from the secondary support member, movable means mounted within the tubes and adapted for determining the fluidity of the liquids within the tubes, each of said movable means including a rod-like member and indicia means mounted thereon, a scale mounted on the vertical support member above the tubes, and trigger means adapted for releasably engaging and re-engaging the rod-like members for setting the movable means and re-engaging the rod-like members of the movable means upon the descent of the movable means within the tubes for comparison of the fluidity of the liquids within the tubes.

2. The combination with a device for ascertaining the fluidity of liquids comprising a substantially vertical support member, a plurality of movable means adapted for ascertaining the fluidity of the liquids, trigger mechanism for engaging and re-engaging the movable means, of a detachable container adapted to be mounted on the aforesaid vertical support member, said detachable container comprising a plurality of tubes for receiving liquids whose fluidity is to be determined, said tubes adapted to receive the aforesaid movable means for the tubes, said container also including an outer closure adapted for receiving liquid for bringing the temperature of the fluid within the plurality of tubes to the same temperature, and complementarily formed means mounted on the container and the aforesaid vertical support member whereby the container is adapted to be attached and detached on the vertical support member.

3. A device for determining the viscosity of a liquid comprising a plurality of parallel tubes adapted to be filled with different liquids, the viscosities of which are to be compared, a mass of specific gravity different from that of said liquids adapted to be positioned within each tube so as to travel therein at rates which are functions of the respective viscosities of the liquids, each mass having a rod-like appendage, means for applying substantially constant retarding force to each rod-like appendage during its travel, and a manually controlled frictional detent means for engaging said appendages at a starting point, for effecting simultaneous release of said appendages, and for re-engaging and stopping said appendages or a part of them at any chosen instant.

4. A device for determining the viscosity of a liquid comprising a support, a plurality of parallel tubes mounted on the support and adapted to be filled with different liquids, the viscosities of which are to be compared, identical masses of specific gravity greater than that of said liquids adapted to be positioned within the tubes so as to descend therein, each said mass having a rod-like appendage, means for applying substantially constant retarding force to the rod-like appendages during their downward travel, and manually controlled frictional detent means for engaging said appendages at a starting point, for effecting release of said appendages, and for re-engaging and arresting said appendages at will, said support and appendages being provided with direct reading indicator means.

5. A viscosity indicator of the falling ball type comprising a support and a plurality of tubes positioned thereon, one tube adapted to contain a liquid standard, the viscosity of which is a standard of comparison, another tube adapted to contain a liquid, the viscosity of which is to be determined, gravity-actuated masses adapted to be positioned within the tubes, each of said masses having an elongated rod-like appendage, means for guiding the said rod-like appendages and for applying thereto a substantially constant frictional retarding force during their downward travel, and a multiple manually controlled detent means mounted on the support for holding the appendages at a common starting point, for permitting simultaneous release of said appendages, and for simultaneously reengaging and arresting said appendages at any instant during their downward travel.

6. A viscosimeter comprising a support, a plurality of parallel tubes inclined at equal angles to the vertical during normal use and mounted on the support, one of the tubes adapted to contain a liquid, the viscosity of which is to be determined and another tube adapted to contain a liquid with which the first liquid is to be compared, gravity-actuated masses adapted to be positioned within the tubes, each of said masses having an elongated rod-like appendage, guide means for said appendages for guiding the same in paths substantially coaxial with said tubes, indicating means associated with said rod-like appendages and said support for indicating the relative positions of said masses in said tubes, the angles of inclination of the rod-like appendages to the vertical being such that the friction between the rod-like appendages and the guide means therefor affords substantially equal resistance to the movements of said masses in said tubes, and detent means cooperative with said appendages for detaining them at a starting point, for simultaneously releasing them, and for simultaneously reengaging them at the will of the operator to arrest any appendage which has not, when re-engaged, completed its course.

7. In a device for comparing the viscosity of liquids, the combination with a multiplicity of substantially parallel tubes, one of said tubes being adapted to contain a liquid having a viscosity to which the others are to be compared, the remaining tubes adapted to contain liquids of unknown viscosity, the aforementioned parallel tubes being normally inclined to the vertical plane for test purposes, means movable within each of the inclined tubes comprising a ball and an elongated rod-like member, means whereby the rod-like appendages are substantially equally retarded during their downward travel, and indicating means associated with said rod-like appendages and said support for indicating the relative positions of said balls in said tubes, and means for initiating downward movement of the balls simultaneously from a common starting point and for arresting them simultaneously as the leader completes its course.

8. A falling ball type of viscosimeter including, in combination, a plurality of tubes for liquid under test, and movable means within the respective tubes, and manually controlled mechanical detent means for normally holding said movable means at a starting point, for causing simultaneous release of said movable means and for re-engaging and arresting said movable means at any chosen instant suitable for obtaining a comparison of the distances traversed in equal time intervals by the respective movable means.

9. In a falling ball type of viscosimeter, in combination, a plurality of respective tubes for liquids under test, movable means within the tubes, and manually operable detent means for retaining said movable means at a common starting point, for simultaneously releasing said movable means, and for simultaneously re-engaging and arresting said movable means at a chosen instant.

10. In a viscosimeter, in combination, a substantially vertical support and a plurality of parallel liquid tubes mounted thereon, movable means in the respective tubes including elongated rods which project beyond the tubes, and guide means for the rods carried by said support, a supporting foot pivotally mounted on the lower end of the aforementioned support for swinging movement between folded and extended positions relative to the said support, whereby in the extended position the supporting foot has a portion engaging the rear of the aforesaid vertical support retaining the viscosimeter in an upright angular position with the tubes inclined to the horizontal so that the movable means moves through the tubes at a controlled rate, and in a folded position the supporting foot is in juxta-position to the tubes so that the viscosimeter is adapted for storing.

References Cited in the file of this patent

UNITED STATES PATENTS

| Number | Name | Date |
|---|---|---|
| 989,822 | Strasburger | Apr. 18, 1911 |
| 1,009,668 | Jass | Nov. 21, 1911 |
| 1,247,523 | Flowers | Nov. 20, 1917 |
| 1,427,922 | Tiffany | Sept. 25, 1922 |
| 1,459,262 | Rode | Jan. 19, 1923 |
| 1,762,639 | Roudie | June 10, 1930 |
| 1,790,948 | Rodgers | Feb. 3, 1931 |
| 2,252,572 | Lang | Aug. 12, 1941 |

FOREIGN PATENTS

| Number | Country | Date |
|---|---|---|
| 487,207 | Germany | Dec. 3, 1929 |

UNITED STATES PATENT OFFICE
CERTIFICATE OF CORRECTION

Patent No. 2,703,489　　　　　　　　　　　　　　　　　　　　March 8, 1955

Fernand L. Gerin

It is hereby certified that error appears in the printed specification of the above numbered patent requiring correction and that the said Letters Patent should read as corrected below.

Column 10, line 31, strike out "respective" and insert the same before "tubes" in line 32; line 33, before "detent" insert --trigger--.

Signed and sealed this 5th day of April, 1955.

SEAL)

ttest:

:. J. MURRY
ttesting Officer

ROBERT C. WATSON
Commissioner of Patents